(12) United States Patent
Miller

(10) Patent No.: US 10,148,794 B1
(45) Date of Patent: *Dec. 4, 2018

(54) METHODS, SYSTEMS, AND ARTICLES OF MANUFACTURE FOR CONFIGURATION-BASED CLIENT-SIDE RESOURCE RESOLUTION FRAMEWORK FOR CUSTOMIZABLE USER EXPERIENCE

(71) Applicant: Intuit Inc., Mountain View, CA (US)

(72) Inventor: Gregory W. Miller, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/267,862

(22) Filed: Sep. 16, 2016

Related U.S. Application Data

(63) Continuation of application No. 14/104,859, filed on Dec. 12, 2013, now Pat. No. 9,451,006.

(51) Int. Cl.
*G06F 15/16* (2006.01)
*H04L 29/06* (2006.01)
*H04L 29/08* (2006.01)

(52) U.S. Cl.
CPC .............. *H04L 67/42* (2013.01); *H04L 67/02* (2013.01); *H04L 67/10* (2013.01)

(58) Field of Classification Search
CPC ................................ H04L 67/42; H04L 67/02
USPC ........................................................ 709/203
See application file for complete search history.

(56) References Cited

U.S. PATENT DOCUMENTS

| | | | |
|---|---|---|---|
| 7,428,546 B2 | 9/2008 | Nori et al. | |
| 7,747,484 B2 | 6/2010 | Stanley et al. | |
| 7,860,763 B1 | 12/2010 | Quinn et al. | |
| 8,204,805 B2 | 6/2012 | Eftekhari et al. | |
| 2002/0194263 A1 | 12/2002 | Murren et al. | |
| 2003/0078949 A1* | 4/2003 | Scholz | G06F 17/2247 715/226 |
| 2004/0153536 A1 | 8/2004 | Strassner | |

(Continued)

OTHER PUBLICATIONS

Non-final Office Action dated May 5, 2016 in U.S. Appl. No. 14/105,005, filed Dec. 12, 2013, inventor: Gregory W. Miller, (34pgs).

(Continued)

*Primary Examiner* — Vivek Srivastava
*Assistant Examiner* — Atta Khan
(74) *Attorney, Agent, or Firm* — DLA Piper LLP US

(57) ABSTRACT

Upon the initiation of a flow instance on a client computing device for navigating through a sequence of webpages, a client-side framework invokes various controllers and resolvers for dynamically creating views displayed in user's browsers. Resolvers resolve various resources required or desired for the webpages and obtain these various resources located on a remote host computer and transmits the obtained resources to the corresponding controllers to create one or more views as specified by the flow for display in the browser of the client computing device, without hard coding the locations of these resources in the webpages. The client-side framework provides an environment for specifying AB testing to place a part of the flow under an A/B test so as to generate different customizable user experiences in navigating through the webpages without using custom views.

20 Claims, 10 Drawing Sheets

(56) References Cited

U.S. PATENT DOCUMENTS

| | | | |
|---|---|---|---|
| 2004/0181532 A1* | 9/2004 | Bernstein | G06F 17/3056 |
| 2004/0205179 A1 | 10/2004 | Hunt et al. | |
| 2006/0242466 A1* | 10/2006 | Tillmann | G06F 11/3684 |
| | | | 714/38.1 |
| 2007/0130138 A1 | 6/2007 | van Wyk et al. | |
| 2007/0208777 A1 | 9/2007 | van Wyk et al. | |
| 2007/0220341 A1* | 9/2007 | Apostoloiu | G06F 11/3664 |
| | | | 714/33 |
| 2007/0294669 A1* | 12/2007 | Robalewski | G06F 9/44505 |
| | | | 717/120 |
| 2008/0046462 A1* | 2/2008 | Kaufman | G06F 17/30392 |
| 2008/0120129 A1 | 5/2008 | Seubert | |
| 2008/0294418 A1 | 11/2008 | Cleary et al. | |
| 2009/0249297 A1* | 10/2009 | Doshi | G06F 11/3668 |
| | | | 717/124 |
| 2010/0070394 A1 | 3/2010 | Wyle | |
| 2010/0251092 A1 | 9/2010 | Sun | |
| 2011/0209049 A1 | 8/2011 | Ghosh et al. | |
| 2012/0109792 A1 | 5/2012 | Eftekhari et al. | |
| 2013/0080516 A1 | 3/2013 | Bologh | |
| 2013/0139096 A1 | 5/2013 | Rist et al. | |
| 2013/0218735 A1 | 8/2013 | Murray | |
| 2013/0254325 A1 | 9/2013 | Song et al. | |
| 2013/0275511 A1 | 10/2013 | Wilson et al. | |
| 2014/0282049 A1* | 9/2014 | Lyon | G06F 3/0484 |
| | | | 715/744 |
| 2014/0289738 A1* | 9/2014 | Paliwal | G06F 8/38 |
| | | | 719/311 |
| 2015/0026246 A1 | 1/2015 | Taylor | |

OTHER PUBLICATIONS

Final Office Action dated May 17, 2016 in U.S. Appl. No. 14/104,911, filed Dec. 12, 2013, inventor: Gregory W. Miller, (44pgs).
Non-Final Office Action dated Dec. 4, 2015 in U.S. Appl. No. 14/104,911, filed Dec. 12, 2013, inventor: Gregory W. Miller, (28pages).
Amendment and Response dated Mar. 4, 2016 in U.S. Appl. No. 14/104,911, filed Dec. 12, 2013, inventor: Gregory W. Miller, (37pages).
http://en.wikipedia.org/wiki/JavaScript, printed Dec. 12, 2013 (24 pages).
www.turbotax.com, printed Dec. 12, 2013 (6 pages).
www.quicken.com, printed Dec. 12, 2013 (6 pages).
http://en.wikipedia.org/wiki/a/B_Jesting, printed Dec. 12, 2013 (3 pages).
http://www.pcworld.com/article/250132/tax_sites_turbotax_is_still_the_one_to_beat.html, printed Dec. 12, 2013 (9 pages).
Amendment and Response dated Aug. 5, 2016 in U.S. Appl. No. 14/105,005, filed Dec. 12, 2013, inventor: Gregory W. Miller, (36pages).
Interview Summary dated Aug. 18, 2016 in U.S. Appl. No. 14/105,005, filed Dec. 12, 2013, inventor: Gregory W. Miller, (3pages).
Request for Continued Examination and Amendment and Response dated Aug. 17, 2016 in U.S. Appl. No. 14/104,911, filed Dec. 12, 2013, inventor: Gregory W. Miller, (29pages).
Interview Summary dated Aug. 17, 2016 in U.S. Appl. No. 14/104,911, filed Dec. 12, 2013, inventor: Gregory W. Miller, (3pages).

* cited by examiner

METHODS, SYSTEMS, AND ARTICLES OF MANUFACTURE FOR CONFIGURATION-BASED CLIENT-SIDE RESOURCE RESOLUTION FRAMEWORK FOR CUSTOMIZABLE USER EXPERIENCE

CROSS REFERENCE TO RELATED APPLICATIONS

This application is a continuation of co-pending U.S. application Ser. No. 14/104,859, filed on Dec. 12, 2013, entitled METHODS, SYSTEMS, AND ARTICLES OF MANUFACTURE FOR CONFIGURATION-BASED CLIENT-SIDE RESOURCE RESOLUTION FRAMEWORK FOR CUSTOMIZABLE USER EXPERIENCE, issued as U.S. Pat. No. 9,451,006, on Sep. 20, 2016, priority of which is claimed under 35 U.S.C. § 120, and the contents of which are incorporated herein by reference as though set forth in full.

This U.S. patent application is related to U.S. application Ser. No. 14/105,005, entitled "METHODS, SYSTEMS, AND ARTICLES OF MANUFACTURE FOR CONFIGURATION-BASED CLIENT-SIDE FLOW CONTROL FRAMEWORK FOR CUSTOMIZABLE USER EXPERIENCE" and filed on Dec. 12, 2013, and U.S. application Ser. No. 14/104,911, entitled "METHODS, SYSTEMS, AND ARTICLES OF MANUFACTURE FOR IMPLEMENTING MODEL DEFINITION AND CONSTRAINT ENFORCEMENT AND VALIDATION" and filed on Dec. 12, 2013. The contents of both U.S. patent applications filed on Dec. 12, 2013 are hereby explicitly incorporated by reference for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Web developer or a programmer may oftentimes need to specify what webpages (e.g., HTML pages) to load and which resources are to be loaded with the webpages. Conventionally, the locations of various resources on a webpage may be hard coded in the webpages, and these various resources may be retrieved at these hard-coded locations when the webpage is being loaded. Some conventional approaches use complex logic on the server side to determine the locations of various resources needed for a webpage. Conventional approaches also lack a way for developers to specify A/B testing resources to place at least some resources under A/B testing. As a result, the developer may need extensive server side technologies and knowledge in the complex logic in developing a website, and the website so developed is not easily customizable to present different user experience in navigating through a sequence of screens in visiting the website.

Therefore, there exists a need for an improved methods and systems for implementing a configuration-based client-side resource resolution framework for customizable user experience.

SUMMARY

Disclosed are various embodiments relating to methods, systems, and articles of manufacture for a configuration-based client-side resource resolution framework for customizable user experience without using or knowing any server side programming or server side frameworks. For example, a Web developer or a programmer may desire to compose screens users may see in common markup languages (e.g., HTML, XML, etc.), specify branching logic or business logic in navigation for the website, or provide custom functionalities for guiding users through their browsing sessions in a dynamic way, without having to use or even know any server-side technologies such as server-side scripting languages such as ASP (Active Server Pages), Python, JavaServer Pages (JSP), Perl, etc. When a flow instance for navigating through a website is started on a client computing device for a webpage, the client-side framework is to invoke various controllers and resolvers to dynamically generate various views for the flow. The resolvers are to resolve various resources required or desired for the webpage and obtain these various resources located on a remote host computer and to transmit the obtained resources to the corresponding controllers to create one or more views as specified by the flow for display in the browser of the client computing device. The resources may include, for example but not limited to, webpages (e.g., HTML pages), scripts written in various interpreted computer programming languages for performing various functionalities, one or more flows or sub-flows, etc.

The resources or other information or data required or desired for various views need not be hard coded in the webpages. For example, the webpages need not include the exact names of the pages or the exact paths for resources. In some embodiments, the client-side framework, which resides on a client computing device, may further provide an environment for the developer of a website to specify A/B testing and its associated resources for a customizable flow through a sequence of pages that the developer may desire the users of the website to experience. In these embodiments, the client-side framework provides an environment for Web developers to customize the flows for their websites in a customizable manner at run time, without having to use complex branching logic or business logic in determining which resources to deliver to what webpage.

Some embodiments are directed at one or more methods for a configuration-based client-side resource resolution framework for customizable user experience. The method may first receive a request for a reference to a resource at a client-side framework. Depending on whether or not the resource is under an A/B test as specified in, for example, flow configuration file or an A/B test configuration file, the client-side framework may load the corresponding resource. For example, if an A/B test dictates that JAVASCRIPT A is to be performed for a webpage if Recipe A is active, and JAVASCRIPT B is to be performed for the webpage if Recipe B is active, the action resolver on the client-side framework may determine the location of the correct JAVASCRIPT file as specified in the A/B test configuration and obtain the actual implementation of the correct or appropriate JAVASCRIPT file based at least in part on which recipe is active in a flow.

More specifically, the client-side framework may identify a request for a reference to a resource from, for example, the flow configuration. The reference to a resource may include, for example but not limited to, an actual pathname or location of the resource located on a remote host computer or a link or other types of identification of the resource on the remote host computer. In other words, various resolvers described herein literally converted various references to resources to actual implementations of these resources. For example, the action controller of the client-side framework may identify or receive a request for a reference to a script object or file to be executed for a webpage that is being loaded onto a browser of a client computing device.

The client-side framework may then invoke an action controller to transmit the reference to an action resolver. The action resolver may then determine or identify the corresponding information for the correct or appropriate resource and determine the actual location of the correct or appropriate resource (e.g., a JAVASCRIPT file) based at least in part upon whether the requested resource is under an A/B test. JAVASCRIPT is a registered trademark of Oracle America Inc., Redwood Shores, Calif. For example, the action resolver may consult an A/B test configuration file and utilize a mapping mechanism to identify the name or identification of a requested resource with the matching location of the resource. The action resolver may then obtain the appropriate resource from a remote host computer based at least in part upon whether the requested resource is under an A/B test as specified in, for example, an A/B test configuration file.

The resource resolver may request for and pull the correct or appropriate resource from a Web server. Alternatively, the resource resolver may request for the resource from a Web server, and the Web server may push the requested resource to the resource resolver. The resource resolver may then transmit the actual implementation of the correct or appropriate resource to the requester that may include, for example but not limited to, a controller (e.g., a flow controller, a view controller, an action controller, etc.)

In these embodiments, the requested resources are stored on a remote host computer (e.g., a Web server hosting the website for which user access is desired). For example, the remote host computer may store thereupon one or more flow configuration files for the flow resolver to obtain for the client-side framework, one or more action resources (e.g., scripts, etc.) for an action resolver to obtain, and one or more view resources for a view controller to obtain.

Some embodiments are directed at an apparatus for implementing various processes described herein. More details about the apparatus for implementing various processes will be described in some of the subsequent paragraphs with reference to one or more drawing figures.

Some embodiments are directed at an article of manufacture having stored thereupon a sequence of instructions which, when executed by a mobile communication device, causes the mobile communication device to perform various processes or to invoke various modules described herein. More details about the article of manufacture will be described in some of the subsequent paragraphs with reference to one or more drawing figures.

Further details of various embodiments of the invention are described in the Detailed Description section with reference to respective figures.

BRIEF DESCRIPTION OF THE FIGURES

The drawings illustrate the design and utility of various embodiments. It should be noted that the figures are not drawn to scale and that elements of similar structures or functions are represented by like reference numerals throughout the figures. In order to better appreciate how to obtain the above-recited and other advantages and objects of various embodiments, a more detailed description of the inventions briefly described above will be rendered by reference to specific embodiments thereof, which are illustrated in the accompanying drawings. Understanding that these drawings depict only certain embodiments and are not therefore to be considered limiting of its scope, certain embodiments will be described and explained with additional specificity and detail through the use of the accompanying drawings in which.

Various embodiments will now be described in detail with reference to the drawings, which are provided as illustrative examples of the invention so as to enable those skilled in the art to practice the invention. Notably, the figures and the examples below are not meant to limit the scope of embodiments. Where certain elements of embodiments can be partially or fully implemented using known components (or methods or processes), portions of such known components (or methods or processes) that are necessary for an understanding of the invention will be described, and the detailed descriptions of other portions of such known components (or methods or processes) will be omitted for ease of explanation and to not obscure embodiments.

DETAILED DESCRIPTION OF ILLUSTRATED EMBODIMENTS

Various embodiments described herein provide a framework residing on a client computing device to resolve references to one or more resources needed or desired for displaying one or more webpages on the client computing device. When a user uses a client computing device to access one or more webpage developed for, for example, using a software application remotely hosted on a remote host computer, the remote host computer transmits one or more scripts (e.g., one or more JAVASCRIPT files) to the client computing device for storage in, for example, the memory allocated for the browser on the client computing device.

The client computing device executes the one or more scripts to initialize one or more resource resolvers or a client-side framework including the one or more resource resolvers. When connected to the remote host computer, the client computing device identifies a request for a reference to a resource residing on the remote host computer. The resource may include a webpage (e.g., an HTML page) to be displayed, a script (e.g., a JAVASCRIPT script or file) to be executed, a flow for guiding a user through a sequence of screens as desired by the developer of the website, etc. The resolver receives the reference and determines the actual location of the resource on the remote host computer by using a matching mechanism. The matching mechanism correlates various references with the corresponding actual locations of these resources. The resolver then requests and obtains the actual implementation of the resource from the remote host computer at the actual location of the resource and returns the obtained resource to the requester (e.g., a controller) to properly display the webpage to the user as desired by the developer of the website.

Figure 1:
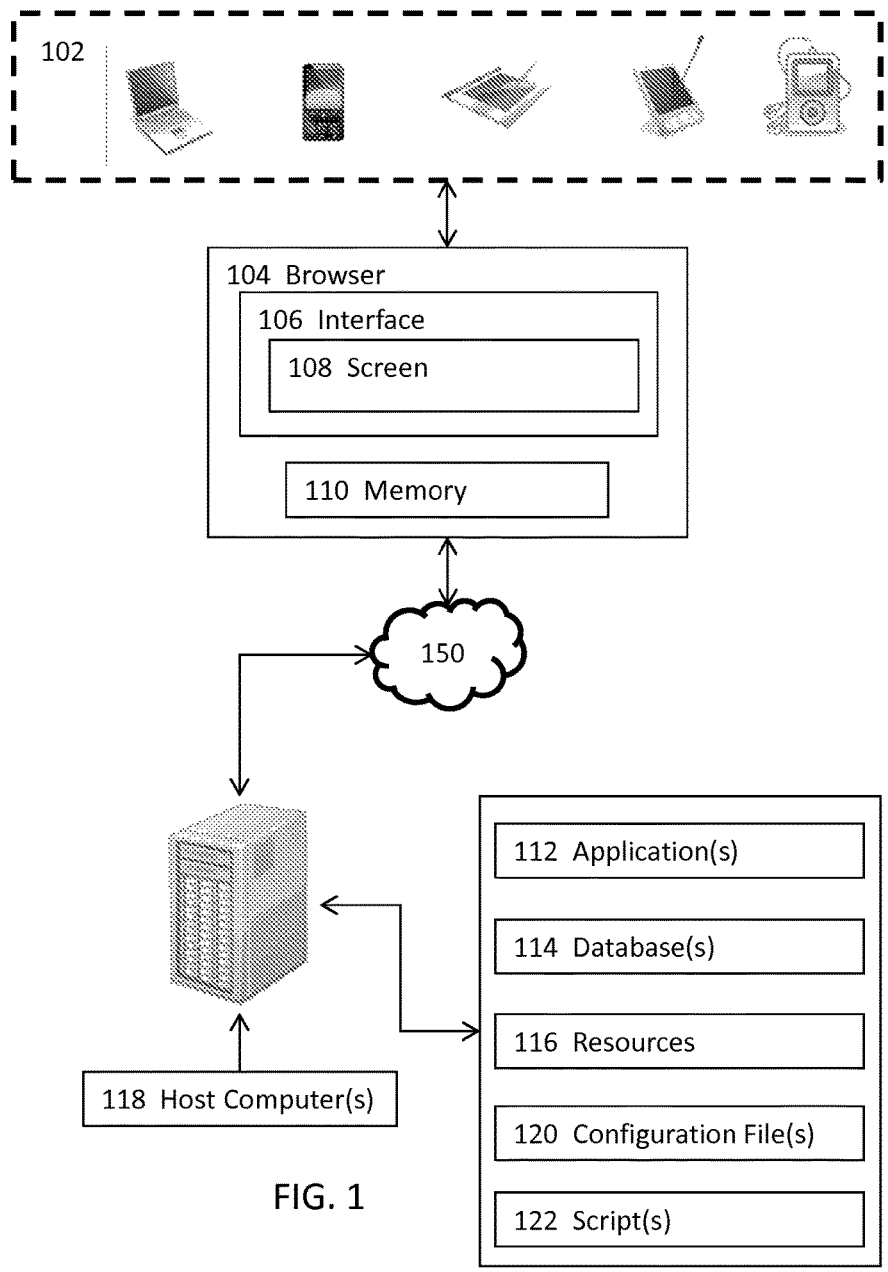
FIG. 1 illustrates a high level schematic diagram of a configuration-based client-side resource resolution framework for customizable user experience in some embodiments.

FIG. 1 illustrates a high level schematic diagram of a configuration-based client-side resource resolution framework for customizable user experience in some embodiments. More specifically, FIG. 1 illustrates a client computing device 102 having installed thereupon a web browser 104 that utilizes, for example, LAN (local area network), WAN (wide area network), wireless networks, cellular services, or other similar services to operatively connect to a remotely located host computer 118 via the Internet 150. The browser 104 on the client computing device 102 may include a user interface having a screen 108 to display webpages to a user. The client computing device 102 may further allocate some non-transitory memory 110 for the web browser 104 or browser for simplicity such that the browser 104 may interactive with, retrieve, present, and traversing information resources on the World Wide Web by using the Uniform Resource Identifier (URI) or Uniform Resource Locator (URL) associated with the information resources such as one or more web pages, images, videos, or other pieces of content.

The remotely located host computer 118 such as a Web server to which the client computing device attempts to connect may either include thereupon or be operatively coupled with one or more applications 112, one or more database(s) 114, one or more resources 116, one or more configuration files 120, or one or more scripts 122. A resource may include an action, a view, or a flow in some embodiments. In these embodiments, a flow includes one or more sub-flows each including one or more flow nodes through which a user may traverse when interacting with a website. A flow node represents a flow state that defines the experience that a user will be going through. A flow node may be further associated with one or more functionalities including, for example, one or more input variables to pass information into a flow when the flow starts or one or more modal specifications to allow running an entire flow or a portion thereof in a modal window including a pop-up window. The "modal" attribute or option may be used interchangeably throughout this application and includes an object in order to make a flow or a portion thereof modal.

The "modal" attribute or option may specify how the modal window behaves when the modal window is closed.

The following pseudo-code represents an illustrated flow node specification.

```
<nodeName>: {
  history: <never|session>[optional]
  state_type: <VIEW|ACTION|FLOW|END>,
  ref: <string>, // reference to a VIEW, ACTION, or FLOW.
References are resolved using the configuration files.
  modal: {[optional]
    closeButton: [Boolean]// supply a close button on the
      modal,
    navWhenDone: [Boolean]// allow the content of a modal
      window navigate the flow controller
    blockCloseWhenErrors: [Boolean]// this option does not
      allow the modal to close if error tool tips are showing
      //
  }
  inputVars: {[optional—for FLOW nodes only]// this
  option is one way to transmit information into a flow
    "varName": varValue // may be a model value or a
      JAVASCRIPT primitive etc. . . .
  }
  transitions: {
    <on response>: <to node>,
    <on response>: <to node>,
    etc. . . .
  }
}
```

Figure 2:
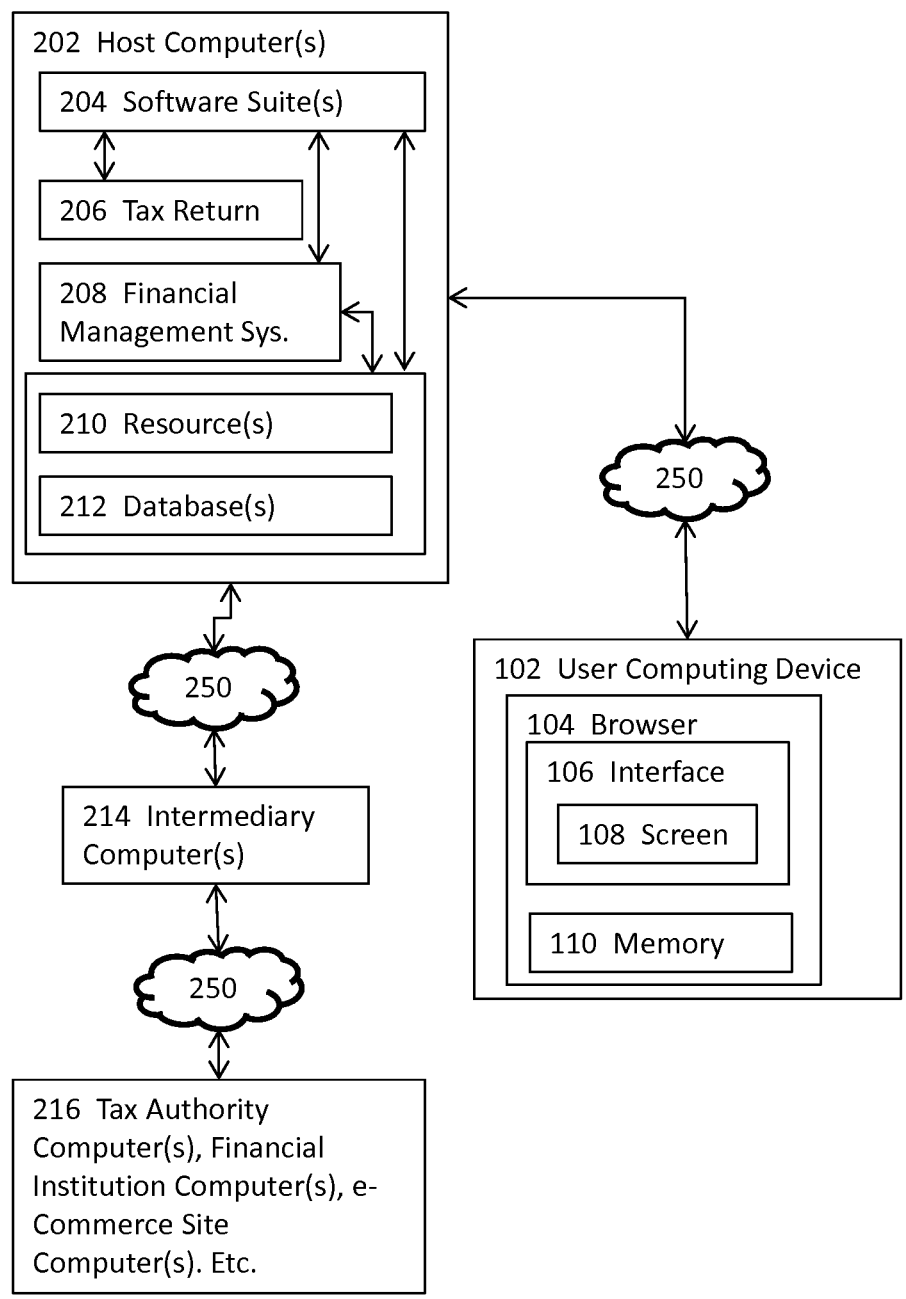
FIG. 2 illustrates another schematic diagram of a configuration-based client-side resource resolution framework for customizable user experience in some embodiments.

FIG. 2 illustrates another schematic diagram of a configuration-based client-side resource resolution framework for customizable user experience in some embodiments. More specifically, the illustrative schematic diagram shows a user computing device 102 including a browser 104 that further includes an interface 106 having a screen 108 and corresponds to some non-transitory memory 110. The client computing device 102 may be operatively connected to one or more host computers 202 via network 250 to access one or more software suites 204 (e.g., TURBO TAX tax return preparation application or software available from Intuit Inc.) that is used to, for example, prepare tax returns 206 or to access one or more financial management systems 208 (e.g., QUICKEN, QUICKEN On-Line, QUICKBOOKS, QUICKBOOKS On-Line, FINANCEWORKS, and MINT financial management systems or software available from Intuit Inc. for personal and/or corporate financial management. Microsoft Money® financial management system of Microsoft Corporation, and PAYCYCLE on-line human resources administrative services, now Intuit Online Payroll, available from Intuit Inc. QUICKEN, QUICKBOOKS, FINANCEWORKS, MINT and PAYCYCLE are registered trademarks of Intuit Inc., Mountain View. Calif., and MICROSOFT is a registered trademark of Microsoft Corporation, Redmond, Wash.

The one or more software suites 204 or the one or more financial management systems 208 may also be coupled with one or more resources 210 or one or more databases 212. The one or more host computers 202 may be operatively coupled to one or more intermediate computers 214 such as some intermediate servers which may be in turn coupled to one or more computers of a tax authority (e.g., Internal Revenue Service), of one or more financial institutions (e.g., banks, credit card issuing institutions, payment gateways, etc.), or of one or more e-commerce sites 216 via network 250.

Figure 3:
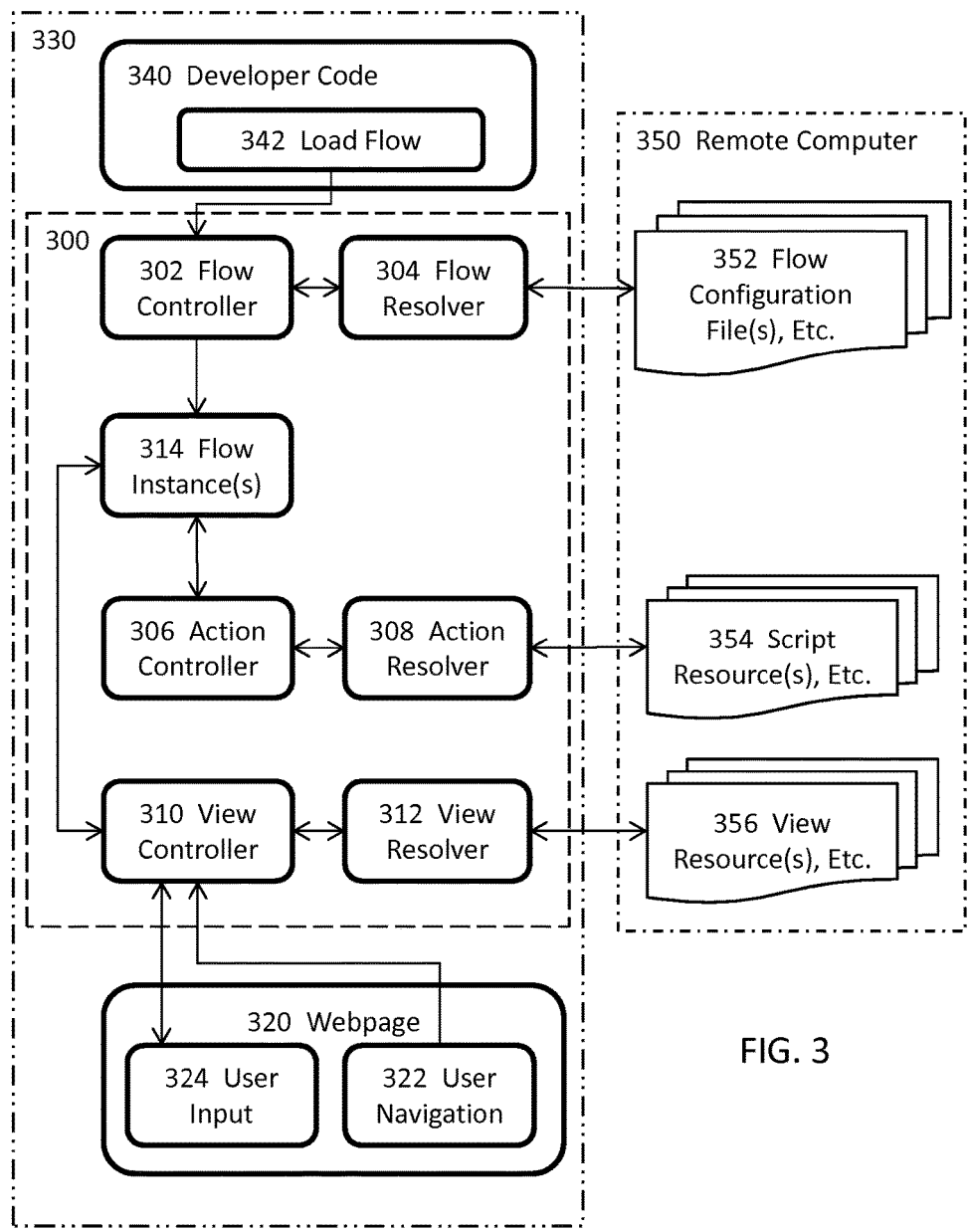
FIG. 3 illustrates a more detailed schematic flow diagram of a configuration-based client-side resource resolution framework for customizable user experience with additional controllers and resolvers in some embodiments.

FIG. 3 illustrates a more detailed schematic flow diagram of a configuration-based client-side resource resolution framework for customizable user experience with additional controllers and resolvers in some embodiments. More specifically, the more detailed schematic flow diagram includes a webpage 330 on a client computing device the webpage 330 having some developer code 340 to load a flow 342. In some embodiments, the developer code 340 may include code written in some scripting languages or code written in some simpler markup language. The webpage 330 further includes the client-side framework 300 that interacts with the portion of the webpage 320 (e.g., some data object model objects, etc.) visible to a user that may further includes one or more fields 324 for accepting and transmitting user input or some user initiated navigation information 322. The developer code may, upon receipt of a request from a user to access webpage (e.g., webpage 320), execute a segment 342 of the developer code 340 to load a flow as the developer desires to load. The client-side framework 300 may then execute one or more script (e.g., one or more JAVASCRIPT files) received from the remotely located computer (e.g., 118 of FIG. 1) when the user attempts to access the webpage via the client computing device (e.g., 102 of FIG. 1) to start the flow. By way of example, the flowing pseudo-code may be used to start a flow.

//*************************************************
* Start up the flow controller and return the first view to the user
*
@params: flowName [string]
    args [object]
    modal [object]
        closeButton [Boolean]
    viewport [string]
    inputVars [object]
    complete: [function]
    error: [function]
@return: none
//*************************************************
FrameworkName.flow.loadPage (pgReference, args)
FrameworkName.flow.loadPage("somePage", {viewport: 'otherViewport'});
FrameworkName.flow.loadPage("somePage", {modal: {closeButton: true}});

In the above illustrated pseudo-code to start a flow. "@params: flowName [string]" indicates the name of the flow reference to load; "args [object]" indicates that all arguments are optional: "modal [object]—closeButton [Boolean]" places a close button on the modal window; "viewport [string]" is used to load the flow into the specified viewport and may use default viewport specified in application options if none is specified: inputVars [object] specifies the name value pairs to be injected into the flow; "complete: [function]" is used to perform a callback when flow is finished; and "error: [function]" is used to perform a callback if the flow or a sub-flow thereof errors out. It shall be noted that the aforementioned pseudo-code for starting a flow is presented in a script language. In some other embodiments, a flow may be started via a list of one or more links (e.g., HTML links) on, for example, a dashboard or in the menu. Some illustrative HTML links may include the following: <button data-loadpage="overviewPage" data-loadpage-options="{viewport:'mainContentArea'}">Load Overview Page<button><button data-loadpage="overviewPage" data-loadpage-options="{modal: {closeButton: true}}">Load Overview Page in Modal</button>

In the above illustrated pseudo-code, the first "<button data-loadpage= . . . " may be used to load, for example, the Overview page, and the second "<button data-loadpage= . . . " may be used to load, for example, the overview page in a modal view. In some embodiments, the "data-loadpage . . . " options may be optional. If the viewport is not specified, the client-side framework may use the viewport from which the even came as the default viewport. If the event did not arise from a viewport, the client-side framework may use the default viewport specified in Application Options which will be described in greater details below. In some other embodiments, a flow may be started from within another flow, rather than by using a script or a list of links as described above. In these embodiments, the flow may be considered as a sub-flow of the another flow.

The client-side framework 300 includes one or more controllers such as a flow controller 302, an action controller 306, and/or a view controller 310. The client-side framework 300 may execute a segment of one or more scripts (e.g., one or more JAVASCRIPT files) to call a method to start each of the one or more controllers. The client-side framework 300 may further optionally include one or more corresponding resolvers including a flow resolver 304 corresponding to the flow controller 302, an action resolver 308 corresponding to the action controller 306, and or a view resolver 312 corresponding to the view controller 310. In some embodiments, a flow controller allows users to specify page to page navigation in their respective applications (e.g., an online tax return preparation software suite or an online financial management software suite, etc.).

A flow controller may also allow transitioning between views, actions, flows, or any combinations thereof. A resolver such as the flow resolver 304 aids the corresponding controller to resolve the references, rather than the hard-coded or actual path names or locations of some resources, the corresponding controller receives for a resource. The resolver may examine a mapping mechanism to determine the actual location of the resource, retrieve or obtain the actual implementation of the resource from the remotely located host computer (e.g., the host computer 118 of FIG. 1), and relay the actual implementation of the resource (e.g., the actual code for an instance of an object) to the flow controller. For example, the flow controller 302 may receive a reference rather than the actual pathname or location for a flow definition object. The corresponding flow resolver 304 may identify the reference received by the flow controller 302, examine a mapping mechanism to identify the actual location or pathname to the actual implementation of the flow definition object (e.g., the piece of code of the flow definition object in JAVASCRIPT Object Notation (JSON)) stored on a remotely located host computer (e.g., a Web server).

The flow resolver 304 may then retrieve or obtain the one or more flow configuration files 352 including the actual implementation (e.g., the one or more JSON files) from the remotely located host computer or browser cache if previously requested, and relay the retrieved or obtained actual implementation of the flow definition object to the flow controller 302. In the embodiments where the client-side framework includes a flow resolver 304, the flow controller 302 receives a reference to a flow configuration object or file, instead of the actual path or location of the flow configuration object or file, and the flow resolver 304 examines a mapping mechanism to identify the actual path or actual location to the requested flow configuration object or file. The flow resolver 304 may then identify and retrieve the actual implementation of the requested flow configuration file or object from the actual location situated on a remotely located host server and then transmit the identified or retrieved actual implementation to the flow controller.

In the case of an action controller 306, the corresponding action resolver 308, if included in the client-side framework 300, may identify a reference received by the action controller 306 to one or more scripts (e.g., one or more JAVASCRIPT files), examine a mapping mechanism to identify the actual locations or pathnames to the actual implementations of the one or more scripts (e.g., one or more pieces of code of the one or more scripts) stored on a remotely located host computer (e.g., a Web server). The action resolver 308 may then retrieve or obtain the one or more script resources 354 including the actual implementations (e.g., the code segments for the one or more scripts) from the remotely located host computer, or browser cache if previously requested, and relay the retrieved or obtained actual implementations of the one or more scripts to the action controller 306.

In the case of a view controller 310, the corresponding view resolver 312, if included in the client-side framework 300, may identify a reference received by the view controller 310 to one or more webpages (e.g., one or more HTML pages), examine a mapping mechanism to identify the actual locations or pathnames to the actual implementations of the one or more webpages (e.g., one or more pieces of code of the one or more webpages) stored on a remotely located host computer (e.g., a Web server). The view resolver 312 may then retrieve or obtain one or more view resources 356 including the actual implementations (e.g., the code segments for the one or more webpages) from the remotely located host computer or browser cache if previously requested and relay the retrieved or obtained actual implementations of the one or more webpages to the view controller 310.

Upon receiving the actual implementation of the flow configuration object or file 352, the flow controller 302 may correctly interpret the flow and reproduce a flow instance 314 by, for example, executing one or more directives from the flow configuration object or file 352. In the event that the flow instance 314 may include results from execution of an act, the flow instance 314 may further send a reference to the act to the action controller 306. In some embodiments where the client-side framework does not include an action resolver, the flow instance 314 may transmit the actual path or location to the act on a remotely located computing system to the action controller 306 so that the action controller 306 may identify and retrieve script source 354 including the actual implementation of the act at the provided path or location.

In some embodiments where the client-side framework includes an action resolver, the flow instance 314 may transmit a reference to the requested act, instead of the actual path or location to the act, on a remotely located computing system to the action controller 306 so that the action resolver 308 may identify and retrieve script source 354 including the actual implementation of the act at the provided path or location on the remotely located host computer. The action resolver 308 may then relay the retrieved script resource 354 to the action controller 306 which may then execute the script resource 354 and deliver the execution results to the flow instance 314 to identify results of execution of the act. In some embodiments where the flow instance 314 may need to display a view, the flow instance may pass a reference to, instead of the actual path or location of, the requested view to the view controller 310.

The view resolver 312 may then identify the actual path or location of the requested view resource by consulting a mapping mechanism and further to retrieve the requested view resource 356 including the actual implementation of the requested view resource 356 from a remotely located host computer. The view resolver 312 may then relay the retrieved view resource 356 to the flow instance 314 to fulfill the request. In some embodiments where the client-side framework does not include a view resolver, the flow instance 314 may pass the actual path or location of the requested view resource 356 to the view controller which is responsible for retrieving the requested view resource 356 from the remotely located host computing system.

The webpage 320 may identify user input 324 (e.g., mouse clicks, data value entries, etc.) and transmit the identified user input 324 to the client-side framework 300 and may also perform some processes on the user input 324 (e.g., validating, formatting, rendering, etc.) by using a view controller 310 to render the processed user input 324 in 320 or to set data for the user input 324. The webpage 320 may also identify the navigation information initiated by the user 322 and transmit the identified navigation information back to the view controller 310 in the client-side framework 300.

By way of example, the following pseudo-code represents an illustrated flow configuration file or object (e.g., the flow configuration file 352).

```
{
  metaData: {[optional]
  }
  require: [optional]
  {
    css: ["path/to/css/file.css", "path/to/css/file2.css", . . . ],
    js: ["path/to/css/file.js", "path/to/css/file2.js", . . . ],
    modelDef: ["modelDef", "modelDef2", . . . ]
  }
  models: [optional]
  modelName: {[optional]
  className: <string>,
  modelDef: <string>
  daoName: <string>
  },
  { . . . }
  { . . . }
  . . .
  ],
  onStart: {[optional]
  ref: <ref>[optional]
  params:
  exp:
  async:
  },
  onEnd: {[optional]
  ref: <ref>[optional]
  params:
  exp:
  async:
  },
  startState: <name>, //[mandatory]
  allowRandomAccess: <true|false>, —[optional] defaults to true
  <flow state>: {
    history: <never|always|session>
    state_type: <VIEW|ACTION|FLOW|END>,
    ref: <string>, //reference to a VIEW, ACTION, or FLOW
    data: {n:v, n:v . . . }
    transitions: {
      <on>: <to>,
```

```
    <on>: <to>,
    etc. . . .
  }
},
<flow state>: {
  . . .
  }
}
```

The "metadata" option may include any metadata deemed important or desired. The "require: . . . " option is used to load any resources that may be needed before a flow starts. For example, the flow configuration file or object includes the "require" option to load the model definitions (via "modelDef"), the JAVASCRIPT files (via "js"), and the style sheet (via "css"). The resources may be loaded asynchronously before the flow starts so that the impact by network latency on communications between a client computing device and a remote host computing system may be reduced or completely eliminated. In addition, the client-side framework may use jQuery promises as return values from functions that perform asynchronous calls.

The "require" may also be called before loading models such that the model configuration or definition of a model may reside in memory before the model is created. The "models" option is used to automatically generate one or more models that the flow may need with the constructor arguments in the "modelName" option and the name of the data access object (DAO) in the option "daoName". The "onStart" option is optional and is used to specify functionality to execute, an action or a reference to the action to call, or an expression to evaluate when the flow for which the flow configuration file or object is created starts. The "onEnd" option is also optional and is used to specify functionality to execute, an action or a reference to an action to call, or an expression to evaluate when the flow ends.

The "async" is used to declare that the onStart actions may be performed asynchronously. The "startState" option may be mandatory to start a flow with the specified flow node. The "allowRandomAccess" is an optional option and includes a binary value (e.g., "true" or "false" indicating whether or not the flow may be navigated via jump inside the flow. The optional option "models" indicates whether a model is to be automatically generated when the flow starts. In some embodiments, the client-side framework may generate a flow scope model every time a flow starts and then removes the flow scope model when the flow ends. The "modelDef" specifies the model definition that defines a particular model, and "daoName" option specifies the name of the Data Access Object (DAO) to use for the specified model.

The following pseudo-code represents an illustrated flow (a sub-flow in this example). In this illustrated flow, the client-side framework may load the flow referenced by "docs.subflow" (e.g., by using a flow resolver) and execute the flow. When the illustrated flow is done, the flow may return a number of responses. For example, if the illustrated flow returns "done", the client-side framework may transition to the flow node "endDone". If the illustrated flow returns "start", the client-side framework may transition to the "start" flow node.

```
"subflow": {
  "state_type": "FLOW",
  "ref": "docs.subflow",
  "transitions": {
  "done": "endDone".
  "start": "start"
  }
}
```

A view includes one or more screens that the user sees and interacts with on a website. The following pseudo-code represents an illustrated view where the view returns the response "goToActionMyThing", possibly resulting from a button click. The next flow node in the flow including the illustrated view may be a flow node with the name "'action_doMyThing'". In addition, if the view returns "startOver", the next flow node may be "start".

```
"pg1": {
  "state_type": "VIEW",
  "ref": "docs.Page1",
  "transitions": {
  "goToActionMyThing": "action_doMyThing",
  "startOver": "start"
  }
}
```

An action includes a script branching logic that determines which path to take in a flow and may return a variety of results. The following pseudo-code may be used to specify an action including a reference ("ref") to some resource named "ActionClass.doSomething". If this illustrated action returns the result "foo", the next flow node in the flow will be a node with the name "foo". If the illustrated action returns results other than "foo" as indicated by the wildcard "*", the flow will transition to the "start" node.

```
"action_doMyThing": {
  "state_type": "ACTION",
  "ref": "ActionClass.doSomthing",
  "transitions": {
  "foo": "bar",
  "*": "start"
  }
}
```

Figure 4:
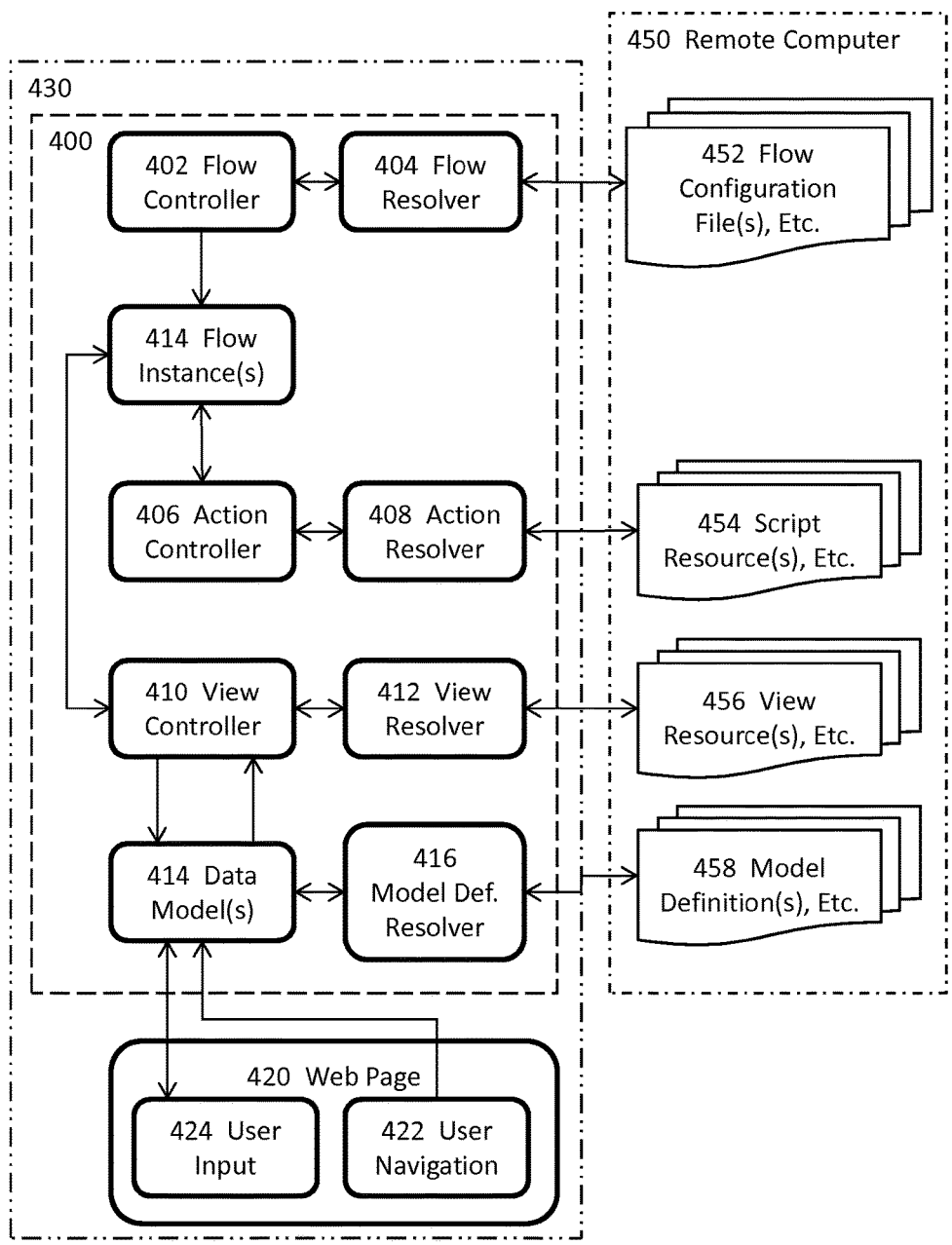
FIG. 4 illustrates another more detailed schematic flow diagram of a configuration-based client-side resource resolution framework for customizable user experience with additional controllers and resolvers in some embodiments.

FIG. 4 illustrates another more detailed schematic flow diagram of a configuration-based client-side resource resolution framework for customizable user experience with additional controllers and resolvers in some embodiments. FIG. 4 is substantially similar to FIG. 3 and illustrates a webpage 430 on a client computing device having some developer code (not shown and similar to the developer code 340 of FIG. 3) to load a flow (also not shown but similar to the flow 342 of FIG. 3). The webpage 430 also includes a client-side framework 400 that includes, as does FIG. 3, a flow controller 402 operatively yet optionally coupled a flow resolver 404 to retrieve one or more flow configuration files or objects 452 located on a remote computer 450 in order to reproduce one or more flow instances 414. The client-side framework 400 further includes the action controller 406 operatively yet optionally coupled to an action resolver 408 to retrieve one or more script resources 454 located on the remote computer 450 and a view controller 410 operatively yet optionally coupled to a view resolver 412 to identify and retrieve one or more view resources 456 from the remote computer 450.

The webpage also includes the webpage 420 having user input 424 and user navigation visible to users in substantially similar manners as those described for FIG. 3 above. The differences between FIG. 3 and FIG. 4 include one or more data models 414 which interact with the view controller 410 to load input definitions and may provide one or more model definitions or configurations to the view controller 410. In some embodiments where the client-side framework 400 includes a model definition resolver 416, the model definition resolver 416 may receive a reference to a model from data models 414, identify the actual path or location of the data model definitions or configurations for the reference by checking a mapping mechanism, and retrieve the model definition or configuration objects 458 including the actual implementation of the model at issue from the remote computer 450 at the identified path or location. Once the model definition or configuration resolver 416 retrieves the model definition object 458 located on the remotely located computing system 450, the model definition resolver 416 may transmit the model definition object 458 to the data models 414 to build the model at issue.

Figure 5:
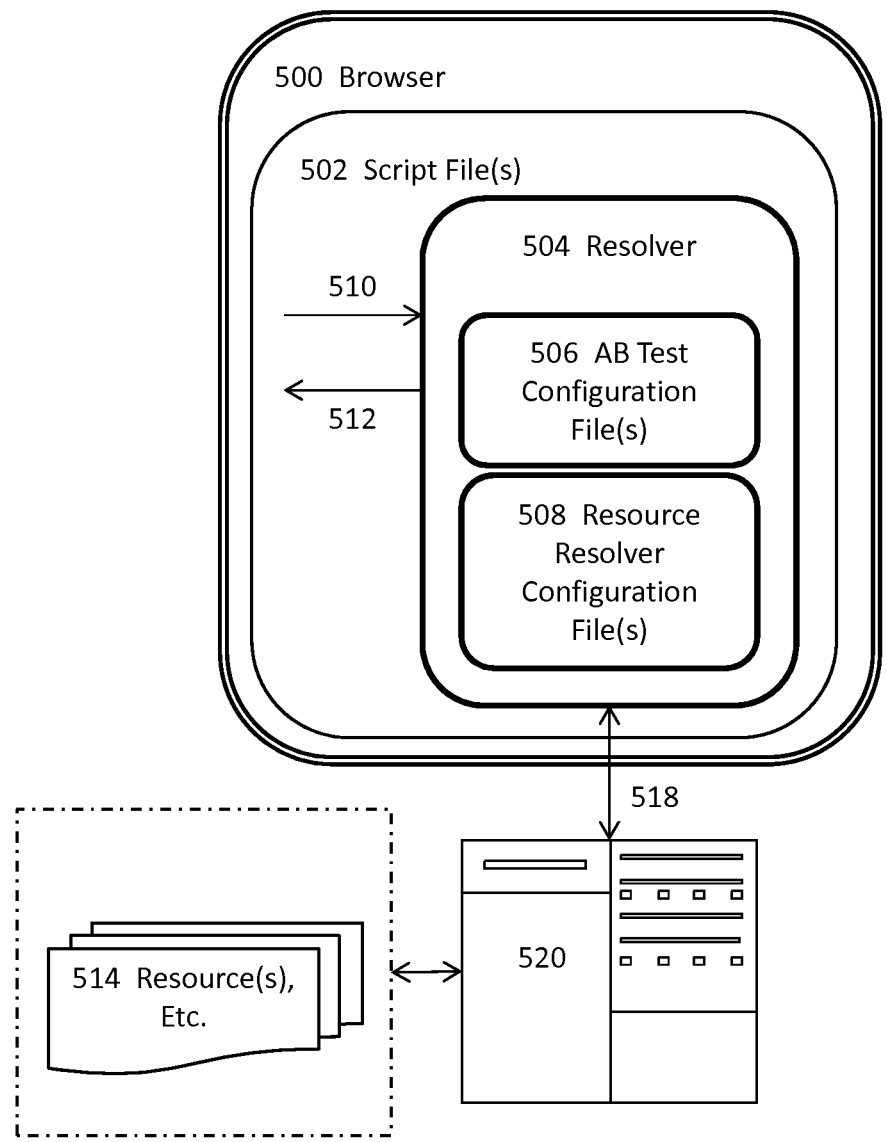
FIG. 5 illustrates a high level schematic diagram of a general resolver in some embodiments.

FIG. 5 illustrates a high level schematic diagram of a general resolver in some embodiments. The schematic diagram illustrated in FIG. 5 shows that a browser 500 installed on a client computing device is operatively coupled to a host computer 520 remotely located from the client computing device. The browser 500 may include one or more script files 502 that are transmitted from the host computer 520 to, for example, some non-transitory memory located on the client computing device and allocated for the browser 500 when a user attempts to access a software application suite hosted on the host computer 520 via network connection 518 such as an Internet or Intranet.

The client computing device may execute the one or more script files 502 obtained from the host computer 520 to initialize the client-side resource framework including a resolver 504 for resource resolution. The resolver 510 may further include one or more A/B test configuration files or objects 506 or one or more resource resolver configuration files or objects 508. In some embodiments, each of the resource resolver configuration files or objects may be stored as an individual file. Multiple resource configuration files or objects may also be grouped and stored as a single resource configuration file or object in some other embodiments.

Alternatively, all of the one or more resource configuration files may be appended to a single file or object. For example, all of the resource resolver configuration files may be appended to a JSON (JAVASCRIPT Object Notation) file such as the flow configuration file. Similarly, each of the one or more A/B test configuration files or objects may be stored as an individual file in some embodiments. In some other embodiments, multiple A/B test configuration files may be stored as a single file or object. Alternatively, all of the A/B test configuration files may be appended to a JSON file such as the JSON file including the one or more resource resolver configuration files.

The client-side framework for resource resolution may transmit or relay a request for a reference to the resource to the resource resolver 504 to identify the actual pathname or location of the resource with which the reference is associated. The reference may be used to identify the actual pathname or location of the resource for which the reference is created but does not in and of itself indicates the actual pathname or location of the resource on a remotely located computing system such as the remote host computer 520. The host computer 520 may be further operatively coupled to one or more resources 514 that are stored on the host computer 520 or in a non-transitory computer readable medium accessible by the host computer 520. For example, the flow controller in the client-side framework may send a request for a reference to a resource to the resource resolver such that the resource resolver may identify or determine where the requested resource is actually stored on the remote host server 520.

The resource resolver 504 may thus receive at 510 a request for a reference to a resource and examine the reference in the request by referencing the one or more resource resolver configuration files 508. A resource resolver configuration file may include a look-up table listing various references to resources and the actual pathnames or locations on a remotely located computing system (e.g., the remote host computer 520) of the resources. A resource resolver configuration file may also include a mapping mechanism such as a complex hash mapping that provides a mapping from resource references to the actual pathnames or locations of instances of the resources on a remotely located computing system. The resource resolver 504 may further access the one or more A/B test configuration files or objects 506 to determine whether a requested resource is included as a part of an A/B test.

An A/B test configuration file includes definitions or configurations indicating what resources are parts of which tests. In addition or in the alternative, an A/B test configuration file may include alternative pathnames or locations on a remotely located host computer to the resources for each test in the A/B test. If the resolver determines that a specific resource is not a part of an A/B test, the resolver may identify or determine the actual pathname or location on a remotely located host computer (e.g., the remote host computer 502), retrieve the actual implementation of the resource from the actual pathname or location from the remotely located host computer via network connection 518, and return the actual implementation of the resource to the calling application (e.g., a flow controller, a view controller, an action controller, etc.) at 512.

On the other hand, if the resolver 504 determines that a requested resource is a part of an A/B test, the resolver 504 may use the information in the A/B test configuration file to determine the actual pathname or location of an instance of the resource (e.g., the alternative, actual pathname or location of the alternative resource) on a remotely located host computer, retrieve the actual implementation of the alternative resource via network connection 518, and return the actual implementation of the alternative resource to the calling application (e.g., flow controller) at 512. The client-side framework allows developers of websites to define multiple test cases, each including multiple recipes. More than one test case may be active at any point in time. Nonetheless, only one recipe may be active for each active test case at a point in time.

In some embodiments, the A/B tests may be specified in a configuration variable that is passed as one of the properties for the initialization of the client-side framework by using the following convention: "Framework.init({ABTestConfig:abtestConfig}):", where "Framework" represents the name of the client-side framework. One or more other properties may also be specified but are omitted in the above illustrative example for brevity and simplicity. By way of example, the following pseudo-code including inline text may be used for a configuration variable.

```
var abtestConfig = {
    testRoot : "abtest",
    mainRoot "main",
    tests : {
        test1 : {
            a: {
                views : ["databinding.Pg1"],
                flows : [ ],
                vars : {
                    testVa : "testValue1a",
                    otherTestVar : "otherValue1a"
                }
            },
            b : {
                views : ["databinding.Pg1"],
                flows : ["subflow"],
                vars : { }
            }
        },
        test2 : {
            a: {
                views : ["databinding.Pg1"],
                flows : [ ],
```

```
            vars : {
                value1 : "First Test Value",
                value2 : "Second Test Value"
            }
        },
        b: {
            views : ["databinding.Pg1"],
            flows : [ ],
            vars : {
                testVar : "testValue2b",
                otherTestVar : "otherValue2b"
            }
        }
    }
  }
};
```

In the example illustrated above, each test recipe in a test case (e.g., "test1" and "test2") may include an array of views, flows, or custom variables. The views or flows listed for an active recipe will be replaced at run time with the version(s) found in the locations resolved by one or more resolvers (e.g., a flow resolver for resolving a reference to a flow or an action resolver for resolving a reference to an action). Moreover, the variables set forth in the "vars" object for the active recipe are accessible at run time as properties of an A/B test model. "testroot" may be optionally specified as shown in the above example. If "testroot" is specified in a configuration variable, "testroot" may be interpreted as the root path of all the test views and flows. If "mainRoot" is specified in the configuration variable, and the default flow or view path starts with that path indicated by "mainRoot", then it may be ignored or omitted in the A/B test version of the path. Considering the following example where the default path to a view is "main/html/views/someView.html": mainRoot="main",
testRoot="abtest".

The path to the file while in test 1, recipe b of the above configuration variable may be: abtest/test1/b/html/views/someView.html. The "main" is thus omitted. In some embodiments, the client-side framework may be placed in a set of tests at any time by call, for example, Framework.setABTests(abtestObj). The keys of the "abtestObj" object are the tests that are set, and the values are the recipe names for each of the tests. Moreover, custom views and flows for test cases may be placed in a path that includes the test name and recipe name. The actual file name for the test flow or view may be the same as the default file name. Considering the following example, if the default views are found in a directory called "html", and the default flows in the "flows" directory, then the following illustrative directory structure may be used for two tests having three recipes each (A, B, and C):

```
|-----html/
|-----flows/
|
|-----abtests/
|
|-----test1/
| |
| |--------A/
| | |--------html/
| | |--------flows/
| |--------B
| | |--------html/
| | |--------flows/
| |--------C/
| | |--------html/
| | |--------flows/
|
|-----test2/
|
|--------A/
| |--------html
| |--------flows/
|--------B/
| |--------html/
| |--------flows/
|--------C/
| |--------html/
| |--------flows/
```

In the above illustrative directory structure, the grouping of the tests under "abtests" may be optional in some embodiments and may be specified in the configuration as shown and described above for the description of FIG. 5.

Figure 6:
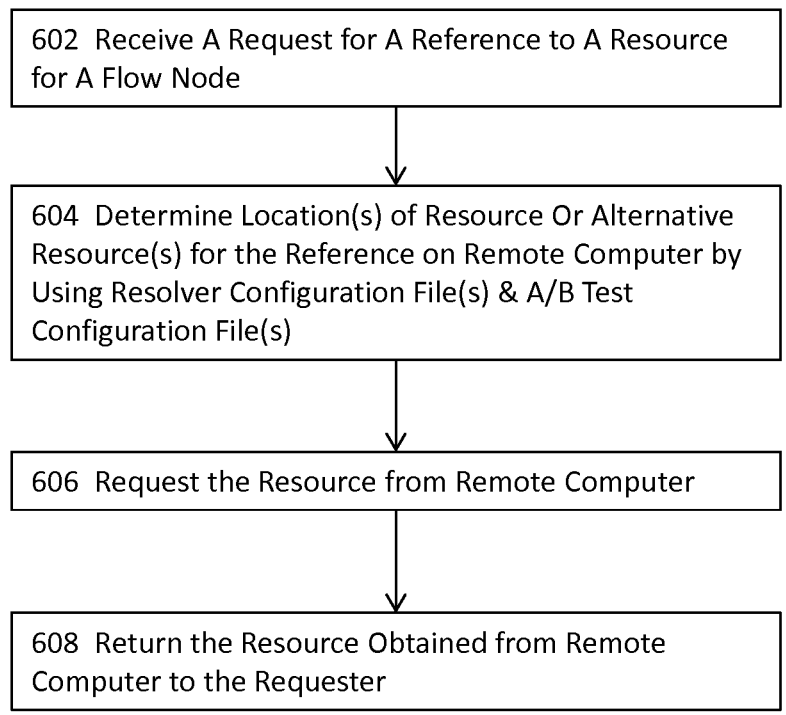
FIG. 6 illustrates a high level process flow diagram of a configuration-based client-side resource resolution framework for customizable user experience in some embodiments.

FIG. 6 illustrates a high level process flow diagram of a configuration-based client-side resource resolution framework for customizable user experience in some embodiments. More specifically, the illustrated process flow may receive a request for a reference to a resource for a flow node at 602. For example, a flow resolver may receive a request for a reference to a flow configuration object for a flow node in a flow at 602. The process flow may use a client-side framework to identify or determine, at 604, the actual location of the resource or the actual, alternative location of an alternative resource for the resource on a remotely located host computer by referencing one or more resolver configuration files and one or more A/B test configuration files.

A resolver configuration file may be set up to aid the client-side framework to identify or determine the location of a requested resource and may include three parts—flow resolver configuration, view resolver configuration, and action resolver configuration. In some embodiments, the three parts may be aggregated into a single resolver configuration file such as a JAVASCRIPT file. In some other embodiments, the three parts may be stored in two or more resolver configuration files.

By way of example, the following pseudo-code may be used for a flow resolver configuration file or object. "Framework" represents the name of the client-side framework in the following example.

```
Framework.options.flowResolverOptions={
    pathToFlows: {
        "default": "scripts/flows",
        "flowscope": "${default}/flowscope",
        "modal": "${default}/modal",
        "quickstart": "${default}/quickstart"
    },
    aliasMap: {
        "subflow": "SubFlowDef.json",
        "demo": "DemoFlowDef.json",
        "*": ".json"
    }
};
```

The following pseudo-code with inline notes enclosed between double forward slashes may be used for a view resolver configuration file or object. "Framework" represents the name of the client-side framework in the following example.

```
Framework.options.viewResolverOptions={
    pathToViews: {
        "default": "html",
        "quickstart": "${default}) quickstart",
```

```
"docs": "${default}/docs",
"community": "${default}/community",
"demo": "${default}/demo",
"releases": "${default}/releases",
"docs.overview": "${docs}/overview",
"docs.data": "${docs}/data",
"docs.templatebinding": "${docs}/templatebinding",
"docs.ui": "${docs}/ui",
"docs.inputstrategies": "${docs}/inputstrategies",
"docs.loadingcontent": "${docs}/loadingcontent",
"docs.flow": "${docs}/flow",
"docs.pubsub": "${docs}/pubsub",
"docs.expressions": "${docs}/expressions",
"docs.abtesting": "${docs}/abtesting",
"docs.widgets": "${docs}/widgets",
"docs.debug": "${docs}/debug",
"demo.uibinding": "${demo}/uibinding",
"demo.databinding": "${demo}/databinding",
"iterator": "${demo}/iterators",
"validation": "${demo}/validation",
"actionexpression": "${demo}/actionexpression",
"flowscope": "${demo}/flowscope",
"modal": "${demo}/modal",
"loanflow": "${demo}/loanflow",
"widget": "${demo}/uiWidgets",
"demo.abtest": "${demo}/abtesting",
"demo.resourceloader": "${demo}/resourceloader"
},
aliasMap: {
  "databinding.Pg1": "Page1.htm",
  "databinding.Pg2": "Page2.htm",
  "databinding.SubflowPg": "SubflowPage.htm",
  "*": ".htm"/* // wildcard may be used to indicate that
    page references map directly to the names of the
    HTML files; must provide default extension for wild-
    carded references* //
  }
};
```

The following pseudo-code with inline notes enclosed between double forward slashes may be used for an action resolver configuration file or object. "Framework" represents the name of the client-side framework in the following example.

```
pathToActions: {
  "ActionClass": "scripts/actions",
  "default": "scripts/actions",
  "loanflow.actions": "scripts/loanflow"
}
};
```

Once the actual location or the actual, alternative location is identified or determined at 604, the client-side framework residing on a client computing device may request and obtain, at 606, the resource or the alternative resource (e.g., pushing by the remote host computer or pulling by the client-side framework for resource resolution) from the remote host computer that is remotely located from the client computing device. At 608, the client-side framework may then relay or return the obtained resource or alternative resource to the calling application. The client-side framework may obtain the actual implementation of an instance of the requested resource or the alternative resource from the remote host computer. For example, the client-side framework may obtain the actual code for a script file in response to a reference to an action, the actual code for an HTML page or a part thereof in response to a reference to a view, the actual code for a flow configuration file or object or a portion thereof in response to a reference to a flow, etc. from a Web server.

Figure 7:
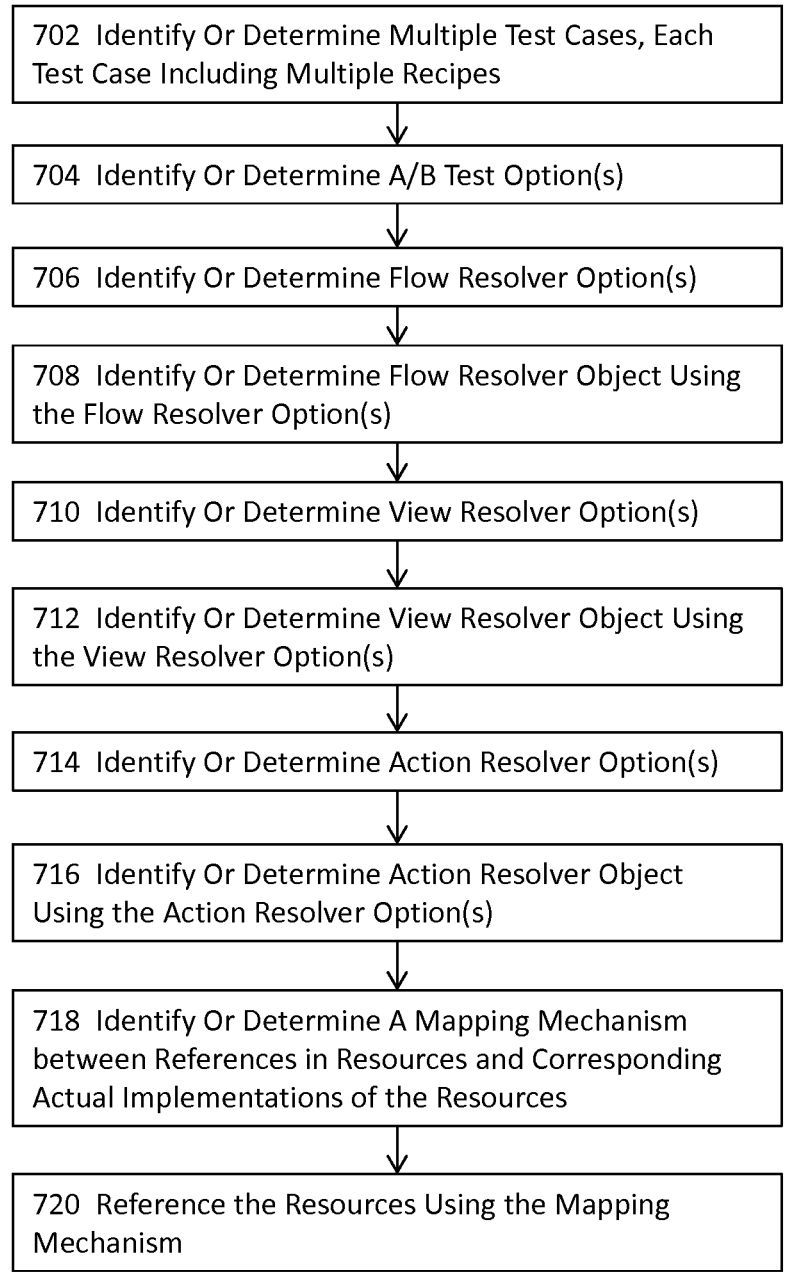
FIG. 7 illustrates a more detailed process flow diagram of a configuration-based client-side resource resolution framework for customizable user experience in some embodiments.

FIG. 7 illustrates a more detailed process flow diagram of a configuration-based client-side resource resolution framework for customizable user experience in some embodiments. At 702, the client-side framework residing on a client computing device identifies or determines multiple test cases, each of which includes multiple recipes. As described above, more than one test case may be active at any point in time, but only one recipe in each test case may be active at a point in time. In some embodiments, multiple tests may be grouped under a single configuration variable such as an A/B test configuration variable described and illustrated above with reference to FIG. 5. At 704, the client-side framework may identify or determine one or more A/B test options and their associated values or attributes by, for example but not limited to, interpreting one or more AB test configuration files or objects. The following pseudo-code may be used for an A B test configuration file or object, where "Framework" represent the name of the client-side framework.

```
Framework.options.ABTestConfig = {
  testRoot : "abtest",
  mainRoot : "main",
  tests : {
    test1 : {
      a : {
        views : ["databinding.Pg1"]
        flows : { },
        vars : {
          testVar : "testValue1a",
          otherTestVar : "otherValue1a"
        }
      },
      b : {
        views : ["databinding.Pg1"],
        flows : ["subflow"],
        vars : { }
      }
    },
    test2 : {
      a : {
        views : ["databinding.Pg1"],
        flows : { },
        vars : {
          value1 : "First Test Value",
          value2 : "Second Test Value"
        }
      },
      b : {
        views : ["databinding.Pg1"],
        flows : {},
        vars : {
          testVar : "testValue2b",
          otherTestVar : "otherValue2b"
        }
      }
    }
  }
};
```

At 706, the client-side framework may identify or determine flow resolver options for the client-side framework. An illustrated example is illustrated and described above with reference to FIG. 6. The client-side framework may identify or determine a flow resolver object for the client-side framework at 708. The following pseudo-code with inline comments may be used to represent a flow resolver object where "Framework" represents the name of the client-side framework.

```
Framework.options.flowResolverOptions={
  pathToFlows: {
    "default": "scripts/flows", // path where your html files
      will reside on your server relative to the main applica-
      tion HTML file.//
```

```
"docs":"${default}/docs/",
"docs.usage":"${docs}/usage/"
}
aliasMap: {
"start": "overview.json".
"docs.usage.subflow": "UsageSubflow.json",
"*": ".json"//* wildcard to indicate that flow refs map
    directly to the names of the json files: may provide
    default extension for wildcarded references* /
}
}
```

The client-side framework may optionally identify or determine one or more view resolver options at 712 and then identify or determine a view resolver object using the identified one or more view resolver options at 714. The following pseudo-code with inline comments may be used to represent a view resolver object where "Framework" represents the name of the client-side framework.

```
Framework.options.viewResolverOptions={
    pathToViews: {
        "default": "html", // path where your html files will reside
            on your server relative to the main application HTML
            file. //
        "ns1":"${default}/namespace1files/",
        "ns1.views": "${ns1}/other/"
    },
    aliasMap: {
    "Pg1": "Page1.htm",
    "ns1.views.Pg2": "Page2.htm",
    "*": ".htm"//* wildcard to indicate that page refs map
        directly to the names of the html files; may provide
        default extension for wildcarded references *
        //
    }
}
```

The client-side framework may optionally identify or determine one or more action resolver options at 716 and then identify or determine an action resolver object using the identified one or more action resolver options at 718. The following pseudo-code with inline notes enclosed between double forward slashes may be used for an action resolver configuration file or object. "Framework" represents the name of the client-side framework in the following example.

```
    pathToActions: {
    "ActionClass": "scripts/actions",
    "default": "scripts/actions",
    "loanflow.actions": "scripts/loanflow"
    }
};
```

The following pseudo-code with inline comments may be used to represent an action resolver object where "Framework" represents the name of the client-side framework.

```
Framework.options.actionResolverOptions={
    pathToActions: {
    "default": "scripts/actions", // path where your
        JAVASCRIPT files will reside on your server relative to
        the main application HTML file. //
    "ActionClass": "${default}/globalActions/",
    }
}
```

At 720, the client-side framework may reference resources using a mapping mechanism. In some embodiments, the client-side framework may reference resources using a mapping mechanism that maps these resources to their actual pathnames or locations of these resources on a remotely located host computer. In some other embodiments, the client-side framework maxy use a hashmap that includes a list of namespaces which maps the references to those resources to actual locations or pathnames on a remotely located host computer. In some embodiments where the references to those resources do not match the names of those resources, the client-side framework may use an "aliasMap" as described above.

Figure 8:
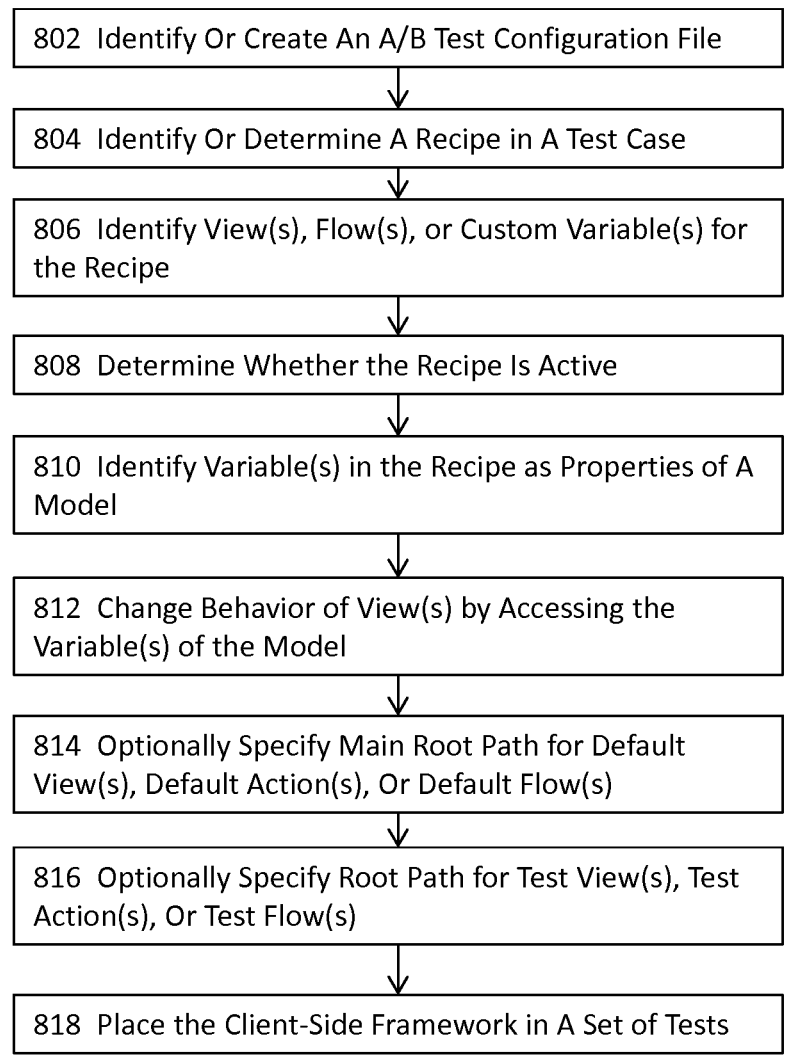
FIG. 8 illustrates another more detailed process flow diagram of a configuration-based client-side resource resolution framework for customizable user experience in some embodiments.

FIG. 8 illustrates another more detailed process flow diagram of a configuration-based client-side resource resolution framework for customizable user experience in some embodiments. More specifically, FIG. 8 illustrates a process flow to configure an A/B test for customizable user experience in navigating through a website and is described below with reference to the illustrated configuration variable in the description for FIG. 5. The process flow illustrated in FIG. 8 may first identify or create an A/B test configuration file on a client computing system at 802. An exemplary A/B test configuration file or object is illustrated and described for reference character 704 of FIG. 7. the process flow may identify or determine a recipe in a test case at 804 and identify one or more views, one or more flows, one or more variables (e.g., custom variables), or any combinations thereof for the identified recipe at 806.

At 808, the process flow may determine whether the identified recipe is active. If it is determined that the identified recipe is active, the process flow may identify the variables in the identified recipe as properties of a model at 810. By using these properties of the model by, for example, setting one or more variables of an active recipe of a test case at run time, the process flow may change, at 812, how the default view may behave, without using any custom views for changes, especially for small changes. The process flow may optionally specify the main root path (e.g., "mainRoot" in the above example) for the default views, default actions, or default flows at 814. At 816, the process flow may optionally specify the root path (e.g., "testroot" in the above examples) for test views, test actions, test flows, etc. At 818, the process flow may place the client-side framework in a set of tests.

Figure 9:
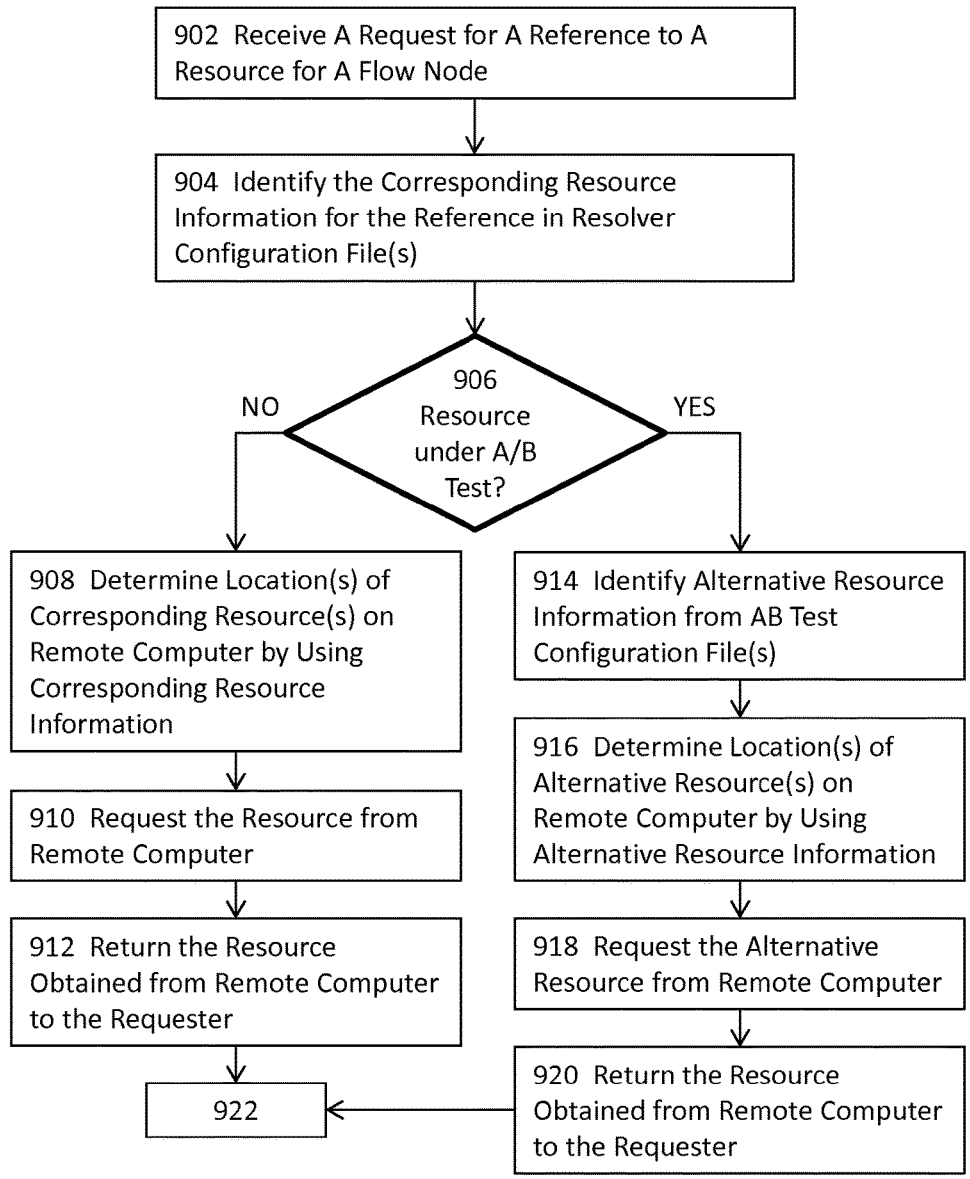
FIG. 9 illustrates another more detailed process flow diagram of a configuration-based client-side resource resolution framework for customizable user experience in some embodiments.

FIG. 9 illustrates another more detailed process flow diagram of a configuration-based client-side resource resolution framework for customizable user experience in some embodiments. More specifically, FIG. 9 illustrates a resolver in a client-side framework for resource resolution in some embodiments. The client-side framework may receive a request for a reference to resource for a flow node at 902. For example, a flow controller in a client-side framework may receive a request for a reference to a flow configuration file residing on a remote host computer.

Another example may be a view controller receiving a request for a reference to a webpage from a flow. Another example may be an action controller receiving a request for a reference to an action (e.g., a JAVASCRIPT file). In these embodiments, the resource may be included in, for example, a flow configuration file or object as a reference, instead of an actual pathname or actual location of the resource on a remotely located host computer. Moreover, the process flow illustrated in FIG. 9 receives a request for a reference to a resource, rather than a request for the resource itself. At 904, the process may identify the corresponding resource information for the reference in one or more resolver configuration files residing on a client computing device. The one or more resolver configuration files may be stored and transmitted from the remotely located host computer (e.g., a Web server hosting an application to which a user attempts to access) to the client computing device when a user attempts to access some assets (e.g., an application, a website, etc.) on the remotely located host computer.

At 904, the client-side framework may identify, for example, the type or name of resource for which access is desired in some embodiments. The resource may include a webpage (e.g., an HTML page), an action (e.g., a JAVASCRIPT file), a flow (e.g., a flow configuration file), or any combinations thereof. The client-side framework may determine whether or not the resource is under an A/B test at 906. If it is determined that the requested resource is not under an A/B test at 906, the client-side framework may invoke a resolver to determine the actual location or actual pathname of the resource on a remotely located host computer by using the corresponding resource information.

For example, a resolver may, at 908, use a mapping mechanism to identify the actual location of the requested resource that corresponds to the name of the requested resource identified at 904. The client-side framework may proceed to 910 to request the resource from the remotely located host computer. In some embodiments, the client-side framework may invoke a corresponding resolver to obtain the actual implementation of the requested resource from the remotely located host computer at 910. For example, the client-side framework may use a flow resolver to obtain, at 910, the actual implementation (e.g., the code) of a flow configuration file or object residing or an instance thereof on a remote Web server by using the actual location of the flow configuration file or object determined at 908.

In another example, the client-side framework may use an action resolver to obtain, for example, a script file residing on a remote Web server at 910 by using the actual location of the script file on the remote Web server. In yet another example, the client-side framework may invoke a view resolver to obtain the actual implementation of the webpage (e.g., the HTML code for the webpage) from a remote Web server by using the actual location of the webpage. The client-side framework may then relay or transmit the actual implementation of the requested resource obtained at 910 to the requester (e.g., a flow, a webpage, a model, etc.) at 912. The client-side framework may proceed to 922 to, for example, repeat the same process for another request for another reference or to continue if there is no further request.

If it is determined at 906 that the requested resource is under an A/B test, the client-side framework may proceed to 914 to identify alternative resource information from an A/B test configuration file as illustrated and described above. A resolver on the client-side framework may then determine the actual location or pathname of an alternative resource, instead of the requested resource, by consulting the actual location or pathname of the alternative resource at 916. At 918, a resolver on the client-side framework may request the alternative from the remotely located host computer to which the alternative resource information refers. A resolver on the client-side framework may obtain the actual implementation of the alternative resource (e.g., an alternative flow configuration file, an alternative webpage, or an alternative JAVASCRIPT file) from the remotely located host computer.

The client-side framework may then transmit the obtained alternative resource to the requester at 920. For example, an action resolver on a client computing device may transmit the JAVASCRIPT files obtained from a Web server to the corresponding action controller: a view resolver on a client computing device may transmit the webpages obtained from a Web server to the corresponding view controller; and a flow resolver on a client computing device may transmit the flow configuration files obtained from a Web server to the corresponding flow controller. The client-side framework may proceed to 922 to, for example, repeat the same process for another request for another reference or to continue if there is no further request.

Figure 10:
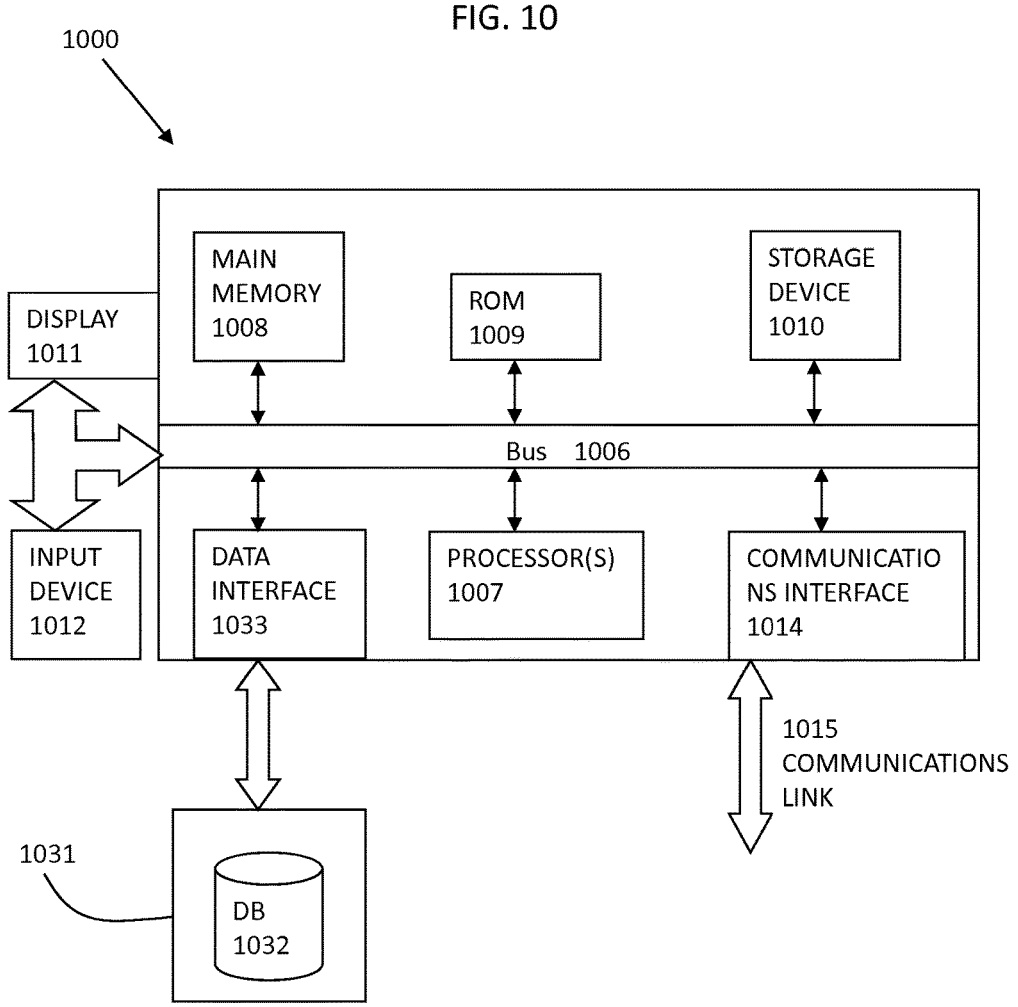
FIG. 10 illustrates a block diagram of an illustrative computing system suitable for implementing various embodiments described herein.

FIG. 10 illustrates a block diagram of components of an illustrative computing system 1000 suitable for implementing various embodiment of the invention. For example, the exemplary computing system 1000 may be used to implement various processes as described in the preceding paragraphs and the figures such as various processes or modules of determining whether the first post is of interest, various analysis processes or modules, various other determining processes or modules, various processes or modules for performing various actions, etc. as described in the remainder of the Application. Computer system 1000 includes a bus 1006 or other communication mechanism for communicating information, which interconnects subsystems and devices, such as processor 1007, system memory 1008 (e.g., RAM), static storage device 1009 (e.g., ROM), disk drive 1010 (e.g., magnetic or optical), communication interface 1014 (e.g., modem or Ethernet card), display 1011 (e.g., CRT or LCD), input device 1012 (e.g., keyboard), and cursor control (not shown).

According to one embodiment of the invention, computer system 1000 performs specific operations by one or more processors or processor cores 1007 executing one or more sequences of one or more instructions contained in system memory 1008. Such instructions may be read into system memory 1008 from another computer readable/usable storage medium, such as static storage device 1009 or disk drive 1010. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention. In the single embodiment or in some embodiments, the one or more processors or processor cores 1007 may be used to perform various actions such as various actions, processes, or modules involving determining, analyzing, performing actions, etc. In some embodiments, at least one of the one or more processors or processor cores 1007 has the multithreading capability.

In one embodiment, the term "logic" shall mean any combination of software or hardware that is used to implement all or part of the invention. In the single embodiment or in some embodiments, the one or more processors or processor cores 1007 may be used to perform various acts such as various acts involving determining, analyzing, performing actions, etc. In some embodiments, at least one of the one or more processors or processor cores 1007 has the multithreading capability to execute a plurality of threads to perform various tasks as described in the preceding sections.

Various actions as described in the preceding paragraphs may be performed by using one or more processors, one or more processor cores, or combination thereof 1007. For example, various processes or modules involving the determining action, various analysis processes or modules, etc. may be performed by one or more processors, one or more processor cores, or combination thereof.

The term "computer readable storage medium" or "computer usable storage medium" as used herein refers to any non-transitory medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), a magnetic tape, any other magnetic or a magneto-optical medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

In an embodiment of the invention, execution of the sequences of instructions to practice the invention is performed by a single computer system 900. According to other embodiments of the invention, two or more computer systems 1000 coupled by communication link 1015 (e.g., LAN, PTSN, or wireless network) may perform the sequence of instructions required to practice the invention in coordination with one another.

Computer system 1000 may transmit and receive messages, data, and instructions, including program, i.e., application code, through communication link 1015 and communication interface 1014. Received program code may be executed by processor 1007 as it is received, and/or stored in disk drive 1010, or other non-volatile storage for later execution. In an embodiment, the computer system 1000 operates in conjunction with a data storage system 1031, e.g., a data storage system 1031 that contains a database 1032 that is readily accessible by the computer system 1000. The computer system 1000 communicates with the data storage system 1031 through a data interface 1033. A data interface 933, which is coupled to the bus 1006, transmits and receives electrical, electromagnetic or optical signals that include data streams representing various types of signal information, e.g., instructions, messages and data. In embodiments of the invention, the functions of the data interface 1033 may be performed by the communication interface 1014.

In the foregoing specification, embodiments have been described with reference to the figures. It will, however, be evident that various modifications and changes may be made thereto without departing from the broader spirit and scope of the invention, and that figures and examples provided are not provided to limit the scope of embodiments. Thus, the specification and drawings are, accordingly, to be regarded in an illustrative rather than restrictive sense.

Further, where methods or processes described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially. It shall also be noted that although various examples described or drawings illustrated herein refer to a merchant's pairing a connected device (e.g., a cellular phone) with a wireless peripheral (e.g., a wireless transaction card reader), various aspects described apply with full and equal effects to any users who are pairing their connected devices to various types of wireless peripherals.

Therefore, the reference to a merchant or a wireless transaction card reader are not intended to and shall not be interpreted as limiting the scope of the application or the scope of the claims, unless otherwise specifically recited or claimed. Accordingly, embodiments are intended to exemplify alternatives, modifications, and equivalents that may fall within the scope of the claims.

What is claimed is:

1. A machine implemented method for implementing a configuration-based client-side flow resource resolution framework residing on a client computing device for customizable user experience, the method being performed by at least the client computing device and comprising:

a client-side framework, that is stored at least partially in memory of and functions in conjunction with at least one microprocessor of a client computing device, the client computing device receiving a request for a reference to a resource for a flow node for a webpage hosted on a remote host computer, wherein the client-side framework is initialized on the client computing device by processing a file located on the client computing device and obtained from the remote host computer;

the client-side framework determining whether the resource or the reference thereto is under an A/B test specified in a resolver configuration file or an A/B test configuration file, wherein the resolver configuration file or the A/B test configuration file includes first information of a plurality of recipes and second information of a plurality of resources or respective references corresponding to the plurality of recipes;

the client-side framework identifying or determining an actual location or pathname of the resource corresponding to the reference by using a resource resolver that accesses the resolver configuration file located on the remote host computer based at least in part upon an active recipe specified for the A/B test, without executing or having to execute server-side logic residing on the remote host computer to determine the actual location or pathname;

the resource resolver in the client-side framework obtaining an actual implementation of the resource from the remote host computer by using at least the actual location or pathname of the reference to the resource; and the client-side framework creating a view for displaying the web page on a display device of the client computing device according to the flow node by using at least the actual implementation of the resource obtained by the resource resolver.

2. The machine implemented method of claim 1, further comprising the client-side framework residing on the client computing device delivering the actual implementation of the resource obtained from the remote host computer to a requester in the client-side framework.

3. The machine implemented method of claim 1, further comprising the client-side framework residing on the client computing device identifying one or more resolver options for the resource resolver;

identifying or determining a resource resolver object for initializing a resource resolver instance for the resource resolver;

identifying one or more controller options for a resource controller; and identifying or determining a resource controller object for initializing a resource controller instance for the resource controller.

4. The machine implemented method of claim 1, further comprising
the client-side framework residing on the client computing device identifying or determining a mapping mechanism that correlates the reference to the resource with the actual location on the remote host computer of the reference; and
the resource resolver residing on the client computing device identifying or determining the actual location on the remote host computer of the reference by using the mapping mechanism.

5. The machine implemented method of claim 4, wherein the mapping mechanism includes a hashmap, the hashmap includes a set of namespaces that map multiple references to different actual locations on the remote host computer, and the client-side framework identifies a key for the hashmap from the resolver configuration file located on the remote host computer.

6. The machine implemented method of claim 1, further comprising:
the client-side framework residing on the client computing device
identifying the A/B test configuration file located on the remote host computer,
determining at least one test case having multiple test recipes;
identifying an active recipe from the multiple test recipes by referencing at least the A/B test configuration file;
identifying and setting at least one value for at least one variable in the active recipe by referencing at least the A/B test configuration file;
the resource resolver residing on the client computing device obtaining a corresponding resource from the remote host computer based at least in part upon the A/B test configuration file; and
the client-side framework creating a view for the flow node by using at least the corresponding resource obtained by the resource resolver.

7. The machine implemented method of claim 1, further comprising:
the client-side framework residing on the client computing device determining whether the resource is under the A/B test at least by examining the resolver configuration file or the A/B test configuration file that corresponds to a mapping mechanism or a table structure pertaining to a plurality of resources; and
the resource resolver obtaining the actual implementation of the resource from the remote host computer based at least in part upon a result of determining whether the resource is under the A/B test, wherein the resource is determined not to be under the A/B test.

8. The machine implemented method of claim 1, further comprising:
the client-side framework residing on the client computing device determining whether the resource is under the A/B test by performing a look-up on a table structure corresponding to the resolver configuration file or the A/B test configuration file; and
the resource resolver identifying an alternative resource based at least in part upon a result of determining whether the resource is under the A/B test.

9. The machine implemented method of claim 8, further comprising the resource resolver:
identifying or determining a first actual location of the alternative resource on the remote host computer based at least in part upon the A/B test configuration file or the resolver configuration file; and
obtaining and transmitting a first actual implementation of the alternative resource from the remote host computer to a requester in the client-side framework based at least in part upon the result, wherein the resource is determined to be under the A/B test.

10. A system for implementing a configuration-based client-side resource resolution framework residing on a client computing device for customizable user experience, comprising:
a client computing device that comprises at least a processor, a browser installed thereupon, and non-transitory memory allocated for the browser;
a client-side framework stored at least partially in the non-transitory memory of and functioning in conjunction with at least one microprocessor of the client computing device, the client-side framework further configured at least to:
receive a request for a reference to a resource for a flow node for a webpage hosted on a remote host computer by using a client-side framework residing on the client computing device, wherein the client-side framework is initialized on the client computing device by processing a file located on the client computing device and obtained from the remote host computer;
determine whether the resource or the reference thereto is under an A/B test specified in a resolver configuration file or an A/B test configuration file, wherein the resolver configuration file or the A/B test configuration file includes first information of a plurality of recipes and second information of a plurality of resources or respective references corresponding to the plurality of recipes;
identify or determine an actual location or pathname of the resource corresponding to the reference by using a resource resolver in the client-side framework to access the resolver configuration file located on the remote host computer based at least in part upon an active recipe specified for the A/B test, without executing or having to execute server-side logic residing on the remote host computer to determine the actual location or pathname;
obtain an actual implementation of the resource from the remote host computer by using at least the resource resolver in the client-side framework with at least the actual location or pathname of the reference to the resource; and
create a view for displaying the web page on a display device of the client computing device according to the flow node by using at least the actual implementation of the resource obtained by the resource resolver.

11. The system of claim 10, wherein the client-side framework residing on the client computing device is configured further to:
identify one or more resolver options for the resource resolver;
identify or determine a resource resolver object for initializing a resource resolver instance for the resource resolver;
identify one or more controller options for a resource controller; and
identify or determine a resource controller object for initializing a resource controller instance for the resource controller.

12. The system of claim 10, wherein the client-side framework residing on the client computing device is further configured to:
  identify or determine a mapping mechanism that correlates the reference to the resource with the actual location on the remote host computer of the reference; and
  identify or determine the actual location on the remote host computer of the reference by using the resource resolver with the mapping mechanism, wherein the mapping mechanism includes a hashmap, the hashmap includes a set of namespaces that map multiple references to different actual locations on the remote host computer, and the client-side framework identifies a key for the hashmap from the resolver configuration file located on the remote host computer.

13. The system of claim 10, wherein the client-side framework residing on the client computing device is further configured to:
  identify the A/B test configuration file or the resolver configuration file located on the remote host computer;
  determine at least one test case having multiple test recipes;
  identify an active recipe from the multiple test recipes by referencing at least the A/B test configuration file or the resolver configuration file;
  identify and set at least one value for at least one variable in the active recipe by referencing at least the A/B test configuration file or the resolver configuration file;
  obtain a corresponding resource from the remote host computer by using the resource resolver based at least in part upon the A/B test configuration file or the resolver configuration file; and
  create a view for the flow node by using at least the corresponding resource obtained by the resource resolver.

14. The system of claim 10, wherein the client computing device is further configured to:
  determine whether the resource is under the A/B test at least by examining the resolver configuration file or the A/B test configuration file that corresponds to a mapping mechanism or a table structure pertaining to a plurality of resources;
  identify an alternative resource based at least in part upon a result of determining whether the resource is under the A/B test by using at least the resource resolver;
  identify or determine a first actual location of the alternative resource on the remote host computer by using at least the resource resolver based at least in part upon the A/B test configuration file or the resolver configuration file; and
  obtain and transmit a first actual implementation of the alternative resource from the remote host computer to a requester in the client-side framework by using at least the resource resolver based at least in part upon the result, wherein the resource is determined to be under the A/B test.

15. A computer program product comprising a non-transitory machine readable storage medium having stored thereupon a sequence of instructions which, when executed by a connected device, causes the connected device to perform a process for implementing a configuration-based client-side resource resolution framework residing on a client computing device for customizable user experience, the process being performed by at least the client computing device and comprising:
  a client-side framework, that is stored at least partially in memory of and functions in conjunction with at least one microprocessor of a client computing device, the client computing device receiving a request for a reference to a resource for a flow node for a webpage hosted on a remote host computer, wherein the client-side framework is initialized on the client computing device by processing a file located on the client computing device and obtained from the remote host computer;
  the client-side framework determining whether the resource or the reference thereto is under an A/B test specified in a resolver configuration file or an A/B test configuration file, wherein the resolver configuration file or the A/B test configuration file includes first information of a plurality of recipes and second information of a plurality of resources or respective references corresponding to the plurality of recipes;
  the client-side framework identifying or determining an actual location of the resource corresponding to the reference by using a resource resolver that accesses the resolver configuration file located on the remote host computer based at least in part upon an active recipe specified for the A/B test, without executing or having to execute server-side logic residing on the remote host computer to determine the actual location or pathname;
  the resource resolver in the client-side framework obtaining an actual implementation of the resource from the remote host computer by using at least the actual location of the reference to the resource; and
  the client-side framework creating a view for displaying the web page on a display device of the client computing device according to the flow node by using at least the actual implementation of the resource obtained by the resource resolver.

16. The computer program product of claim 15, the process further comprising: the client-side framework residing on the client computing device identifying one or more resolver options for the resource resolver; identifying or determining a resource resolver object for initializing a resource resolver instance for the resource resolver;
  identifying one or more controller options for a resource controller; and identifying or determining a resource controller object for initializing a resource controller instance for the resource controller.

17. The computer program product of claim 15, the process further comprising: the client-side framework residing on the client computing device identifying or determining a mapping mechanism that correlates the reference to the resource with the actual location on the remote host computer of the reference; and the resource resolver residing on the client computing device identifying or determining the actual location on the remote host computer of the reference by using the mapping mechanism, wherein the mapping mechanism includes a hashmap, the hashmap includes a set of namespaces that map multiple references to different actual locations on the remote host computer, and the client-side framework identifies a key for the hashmap from the resolver configuration file located on the remote host computer.

18. The computer program product of claim 15, the process further comprising: the client-side framework residing on the client computing device identifying an AB test configuration file or the resolver configuration file located on the remote host computer, determining at least one test case having multiple test recipes, identifying an active recipe from the multiple test recipes by referencing at least the A/B test configuration file or the resolver configuration file, identifying and setting at least one value for at least one variable in the active recipe by referencing at least the A/B test configuration file or the resolver configuration file; the resource resolver residing on the client computing device obtaining a corresponding resource from the remote host computer based at least in part upon the A/B test configuration file or the resolver configuration file; and the client-side framework creating a view for the flow node by using at least the corresponding resource obtained by the resource resolver.

19. The computer program product of claim 15, the process further comprising: the client-side framework residing on the client computing device determining whether the resource is under the A/B test at least by examining the resolver configuration file or the A/B test configuration file that corresponds to a mapping mechanism or a table structure pertaining to a plurality of resources; and the resource resolver obtaining the actual implementation of the resource from the remote host computer based at least in part upon a result of determining whether the resource is under the A/B test, wherein the resource is determined not to be under the A/B test.

20. The computer program product of claim 15, the process further comprising: the client-side framework residing on the client computing device determining whether the resource is under the A/B test by performing a look-up on a table structure corresponding to the resolver configuration file or the A/B test configuration file; and the resource resolver identifying an alternative resource based at least in part upon a result of determining whether the resource is under the A/B test.

\* \* \* \* \*